(12) United States Patent
Muehling et al.

(10) Patent No.: US 10,309,456 B2
(45) Date of Patent: Jun. 4, 2019

(54) BEARING

(71) Applicant: SAINT-GOBAIN PERFORMANCE PLASTICS CORPORATION, Solon, OH (US)

(72) Inventors: Sven Muehling, Brueggen (DE); Ahmet Oeztuerk, Willich (DE); Thiemo Kuesters, Viersen (DE)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 15/665,586

(22) Filed: Aug. 1, 2017

(65) Prior Publication Data

US 2018/0038415 A1 Feb. 8, 2018

Related U.S. Application Data

(60) Provisional application No. 62/370,021, filed on Aug. 2, 2016.

(51) Int. Cl.
| | |
|---|---|
| *F16C 33/08* | (2006.01) |
| *F16C 43/02* | (2006.01) |
| *F16C 35/02* | (2006.01) |
| *B21D 53/10* | (2006.01) |
| *F16C 17/00* | (2006.01) |

(52) U.S. Cl.
CPC .............. *F16C 33/08* (2013.01); *F16C 35/02* (2013.01); *F16C 43/02* (2013.01); *B21D 53/10* (2013.01); *F16C 17/00* (2013.01); *F16C 2240/90* (2013.01); *Y10T 29/49668* (2015.01); *Y10T 29/49671* (2015.01)

(58) Field of Classification Search
CPC ........ F16C 17/02; F16C 33/08; F16C 33/208; F16C 35/02; F16C 43/02; F16C 2240/90; B21D 53/10; Y10T 29/49668; Y10T 29/49671
USPC .... 384/129, 261, 276, 295–296, 283; 16/21, 16/2.2, 2.1; 29/898.054; 73/370.11; 415/229; D8/354
See application file for complete search history.

(56) References Cited

U.S. PATENT DOCUMENTS

| | | | |
|---|---|---|---|
| 231,866 A | 8/1880 | Taylor et al. |
| 259,948 A | 6/1882 | Tourville |
| 389,819 A | 9/1888 | Meneely |

(Continued)

FOREIGN PATENT DOCUMENTS

| | | |
|---|---|---|
| EP | 0668545 A2 | 8/1995 |
| JP | H11303857 A | 11/1999 |

(Continued)

OTHER PUBLICATIONS

International Search Report for PCT/US2017/044800, dated Oct. 16, 2017, 1 page.

*Primary Examiner* — Marcus Charles
(74) *Attorney, Agent, or Firm* — Abel Schillinger, LLP; Chi Suk Kim

(57) ABSTRACT

A bearing can include a generally cylindrical sidewall, a flange extending radially from the generally cylindrical sidewall, and a feature extending radially from the generally cylindrical sidewall at a location disposed a distance from the flange. An assembly can include the beating and a structure having an opening with a relief portion adapted to receive the feature.

19 Claims, 4 Drawing Sheets

(56) References Cited

U.S. PATENT DOCUMENTS

| | | | |
|---|---|---|---|
| 413,525 A | 10/1889 | Libbey | |
| 447,531 A | 3/1891 | Andrews | |
| 503,609 A | 8/1893 | Lobben | |
| 548,651 A | 10/1895 | Morrison | |
| 590,322 A | 9/1897 | Kilburn | |
| 616,094 A | 12/1898 | Farnell | |
| 664,946 A | 1/1901 | Haenichen | |
| 917,522 A | 4/1909 | Baker et al. | |
| 1,029,075 A | 6/1912 | Lockwood | |
| 1,091,830 A | 3/1914 | George | |
| 1,151,847 A | 8/1915 | Ahrens | |
| 1,182,188 A | 5/1916 | McGowan | |
| 1,197,006 A | 9/1916 | Brown | |
| 1,325,849 A | 12/1919 | Hoover | |
| 1,327,301 A | 1/1920 | Watson | |
| 1,346,121 A | 7/1920 | Golly | |
| 1,526,632 A | 2/1925 | Fischbach | |
| 1,615,499 A | 1/1927 | Angell | |
| 1,648,441 A | 11/1927 | Brower | |
| 1,759,149 A | 5/1930 | Alsaker | |
| 1,790,253 A | 1/1931 | Taylor | |
| 1,882,102 A | 10/1932 | Wallgren | |
| 1,904,203 A | 4/1933 | Cope | |
| 1,947,066 A | 2/1934 | Sieg | |
| 1,998,888 A | 4/1935 | Wallgren | |
| 2,006,404 A | 7/1935 | Merwin | |
| 2,016,757 A | 10/1935 | Tryon | |
| 2,019,564 A | 11/1935 | Frantz et al. | |
| 2,043,790 A | 6/1936 | Baker | |
| 2,074,203 A | 3/1937 | Benedek | |
| 2,088,937 A | 8/1937 | Aderhold, Jr. | |
| 2,103,895 A | 12/1937 | Christensen | |
| 2,113,167 A | 4/1938 | Baumheckel | |
| 2,126,039 A | 8/1938 | Reed | |
| 2,145,864 A | 2/1939 | Denneen et al. | |
| 2,174,261 A | 9/1939 | Griswold | |
| 2,182,012 A | 12/1939 | Bunnell | |
| 2,182,247 A | 12/1939 | Catland | |
| 2,226,524 A | 12/1940 | Runge et al. | |
| 2,259,447 A | 10/1941 | Barrows et al. | |
| 2,283,939 A | 5/1942 | Miller | |
| 2,306,048 A | 12/1942 | Fast | |
| 2,309,397 A | 1/1943 | Illmer | |
| 2,317,240 A | 4/1943 | Zeier | |
| 2,331,652 A | 10/1943 | Buckendale | |
| 2,350,272 A | 5/1944 | Copp | |
| 2,358,510 A * | 9/1944 | Holland | B61F 5/12 213/31 |
| 2,369,684 A | 2/1945 | Nash et al. | |
| 2,404,429 A | 7/1946 | Brittain, Jr. | |
| 2,424,757 A | 7/1947 | Klumpp, Jr. | |
| 2,436,274 A | 2/1948 | Watt | |
| 2,440,890 A | 5/1948 | Birmann | |
| 2,474,489 A | 6/1949 | Mortensen | |
| 2,530,520 A | 11/1950 | Hackethal et al. | |
| 2,557,813 A | 6/1951 | Burton | |
| 2,575,830 A | 11/1951 | O'Malley | |
| 2,608,448 A | 8/1952 | Williams | |
| 2,614,897 A | 10/1952 | Kircher et al. | |
| 2,631,905 A | 3/1953 | Coppen | |
| 2,638,388 A | 5/1953 | Tunley | |
| 2,652,296 A | 9/1953 | Palmgren et al. | |
| 2,665,176 A | 1/1954 | Brantingham | |
| 2,685,483 A | 8/1954 | Morra | |
| 2,693,965 A | 11/1954 | Briney, Jr. | |
| 2,719,064 A | 9/1955 | Barnard | |
| 2,765,657 A | 10/1956 | Gilmore | |
| 2,861,850 A | 11/1958 | Nyblom | |
| 2,897,022 A | 7/1959 | Marola | |
| 2,980,472 A | 4/1961 | Harkenrider | |
| 2,989,327 A | 6/1961 | Hermanus | |
| 2,991,134 A | 7/1961 | Harkenrider | |
| 3,001,007 A | 9/1961 | Klumpp, Jr. et al. | |
| 3,005,324 A | 10/1961 | Zeller | |
| 3,035,878 A | 5/1962 | Bell et al. | |
| 3,053,580 A | 9/1962 | Bullard, III et al. | |
| 3,058,786 A | 10/1962 | Banerian | |
| 3,061,385 A | 10/1962 | Horger et al. | |
| 3,095,770 A | 7/1963 | Binns | |
| 3,101,222 A | 8/1963 | McEwen | |
| 3,116,957 A | 1/1964 | Fikse | |
| 3,156,507 A | 11/1964 | Hover et al. | |
| 3,159,045 A | 12/1964 | Lohr | |
| 3,333,908 A | 8/1967 | McClelland | |
| 3,350,148 A | 10/1967 | Sanguinetti et al. | |
| 3,351,394 A | 11/1967 | Hooker | |
| 3,369,852 A | 2/1968 | Emmerson et al. | |
| 3,372,960 A | 3/1968 | Fisher | |
| 3,411,335 A | 11/1968 | Dragar | |
| 3,413,046 A | 11/1968 | Kincaid | |
| 3,438,686 A * | 4/1969 | Stone | F16C 17/10 384/296 |
| 3,441,288 A | 4/1969 | Boughner | |
| 3,510,178 A | 5/1970 | Sowatzke | |
| 3,574,492 A | 4/1971 | Schwary | |
| 3,618,443 A * | 11/1971 | Fitzner | F16B 19/004 277/630 |
| 3,677,613 A | 7/1972 | Houtz | |
| 3,804,479 A | 4/1974 | Butzow et al. | |
| 3,874,752 A | 4/1975 | Imazaike | |
| 3,881,791 A | 5/1975 | Hentschel | |
| 3,893,734 A | 7/1975 | Ulbrich | |
| 4,035,039 A | 7/1977 | Johansson et al. | |
| 4,048,703 A * | 9/1977 | Lehnhart | B21D 53/10 29/898.057 |
| 4,056,293 A | 11/1977 | Lobeck et al. | |
| 4,090,749 A | 5/1978 | Daniels | |
| 4,136,748 A | 1/1979 | Dickerhoff | |
| 4,211,453 A | 7/1980 | Johansson | |
| 4,277,113 A | 7/1981 | Heshmat | |
| 4,341,426 A | 7/1982 | Clapp | |
| 4,353,146 A * | 10/1982 | Brockhaus | E05D 5/14 16/273 |
| 4,403,814 A | 9/1983 | Koss et al. | |
| 4,487,379 A * | 12/1984 | Drechsler | G01B 3/1041 242/375.2 |
| 4,514,098 A | 4/1985 | Ippolito | |
| 4,535,196 A * | 8/1985 | Milne | H02G 3/0683 16/2.1 |
| 4,598,603 A | 7/1986 | Hiramitsu et al. | |
| 4,685,172 A | 8/1987 | O'Connor | |
| 4,715,732 A | 12/1987 | Sanders | |
| 4,773,210 A | 9/1988 | Landwehrkamp et al. | |
| 4,828,403 A | 5/1989 | Schwartzman | |
| 4,878,820 A | 11/1989 | Doi et al. | |
| 4,884,899 A | 12/1989 | Schwartzman | |
| 4,907,814 A | 3/1990 | Foster | |
| 4,965,965 A | 10/1990 | Wallin et al. | |
| 5,056,965 A | 10/1991 | Tsui et al. | |
| 5,125,754 A | 6/1992 | Ide | |
| 5,128,574 A | 7/1992 | Koizumi et al. | |
| 5,163,812 A | 11/1992 | Klaus | |
| 5,190,450 A | 3/1993 | Ghosh et al. | |
| 5,192,137 A | 3/1993 | Renard | |
| 5,228,787 A | 7/1993 | Lawson | |
| 5,269,607 A | 12/1993 | Lawson | |
| 5,330,322 A | 7/1994 | Aubry | |
| 5,332,329 A | 7/1994 | Hill et al. | |
| 5,340,247 A | 8/1994 | Cuneo et al. | |
| 5,393,145 A | 2/1995 | Ide | |
| 5,441,347 A | 8/1995 | Ide | |
| 5,471,859 A | 12/1995 | Sendzimir et al. | |
| 5,511,885 A | 4/1996 | Coleman | |
| 5,520,466 A | 5/1996 | Everitt et al. | |
| D373,069 S * | 8/1996 | McCarthy | D8/354 |
| 5,549,394 A | 8/1996 | Nowak et al. | |
| 5,564,836 A | 10/1996 | Ide et al. | |
| 5,609,421 A * | 3/1997 | Schulze-Eyssing | F16C 11/02 384/125 |
| 5,664,890 A | 9/1997 | Nowak et al. | |
| 5,704,752 A * | 1/1998 | Logerot | F16B 19/1081 403/248 |

(56) References Cited

U.S. PATENT DOCUMENTS

| | | | |
|---|---|---|---|
| 5,735,631 A * | 4/1998 | Patzelt | B62D 1/189 |
| | | | 280/775 |
| 5,885,006 A | 3/1999 | Sheedy | |
| 5,887,984 A | 3/1999 | Duval | |
| 5,906,029 A * | 5/1999 | Fox | F16C 11/02 |
| | | | 16/221 |
| 6,015,236 A | 1/2000 | Niegel et al. | |
| 6,036,370 A | 3/2000 | Kessen et al. | |
| 6,079,897 A | 6/2000 | Schweitzer | |
| 6,138,320 A | 10/2000 | Komo | |
| 6,210,103 B1 | 4/2001 | Ramsay | |
| 6,231,239 B1 | 5/2001 | Damour et al. | |
| 6,288,878 B1 * | 9/2001 | Misso | F16C 27/04 |
| | | | 360/264.3 |
| 6,431,755 B1 | 8/2002 | Schneider | |
| 6,447,166 B1 | 9/2002 | Ray et al. | |
| 6,498,475 B2 | 12/2002 | Foster et al. | |
| 6,530,692 B2 | 3/2003 | Wyer | |
| 6,536,781 B2 | 3/2003 | Barton et al. | |
| 6,547,440 B2 | 4/2003 | Testroet et al. | |
| 6,559,633 B1 | 5/2003 | Nachtigal et al. | |
| 6,568,854 B2 | 5/2003 | Schleinitz | |
| 6,634,616 B2 | 10/2003 | Belknap | |
| 6,637,827 B2 | 10/2003 | Hurwitz | |
| 6,648,514 B2 | 11/2003 | Cevasco et al. | |
| 6,663,330 B2 * | 12/2003 | Powell | F02B 75/22 |
| | | | 411/383 |
| 6,682,299 B2 * | 1/2004 | Bowen | F01D 9/02 |
| | | | 384/273 |
| 6,710,485 B2 * | 3/2004 | Steuer | H02K 5/15 |
| | | | 310/89 |
| 6,804,872 B2 * | 10/2004 | Powell | F02B 75/22 |
| | | | 277/593 |
| 6,868,810 B2 | 3/2005 | Hojo et al. | |
| 6,936,951 B1 | 8/2005 | Cheng et al. | |
| 6,962,444 B2 | 11/2005 | Oi | |
| 7,028,641 B1 * | 4/2006 | Martin | A01K 1/04 |
| | | | 119/791 |
| 7,117,709 B2 * | 10/2006 | Gotzmann | F16C 9/04 |
| | | | 72/370.11 |
| 7,220,057 B2 | 5/2007 | Hoppe | |
| 7,246,948 B2 | 7/2007 | Fisk | |
| 7,270,481 B1 | 9/2007 | Chang | |
| 8,075,190 B1 | 12/2011 | Wadehn et al. | |
| 8,079,761 B1 | 12/2011 | Wadehn et al. | |
| 8,172,531 B2 | 5/2012 | Wadehn | |
| 8,408,800 B2 | 4/2013 | Hagan | |
| 8,439,573 B2 | 5/2013 | Zuiko | |
| 8,443,490 B2 * | 5/2013 | Forrest | E05D 7/02 |
| | | | 16/387 |
| 8,727,630 B2 | 5/2014 | Guthrie | |
| 8,757,890 B2 | 6/2014 | Baker et al. | |
| 8,876,390 B2 | 11/2014 | McNeil | |
| 8,910,385 B2 | 12/2014 | Fisk | |
| 8,967,868 B2 | 3/2015 | Wright | |
| 8,978,201 B2 * | 3/2015 | Vess | E05D 7/00 |
| | | | 16/2.1 |
| 8,985,857 B2 | 3/2015 | Schmidt et al. | |
| 8,992,089 B2 | 3/2015 | Raby et al. | |
| 8,998,495 B2 | 4/2015 | Hirose et al. | |
| 9,011,010 B2 | 4/2015 | Mueller et al. | |
| 9,233,705 B2 * | 1/2016 | Harada | B62D 1/187 |
| 9,771,973 B2 * | 9/2017 | Ambroise | F16C 17/10 |
| 2002/0028031 A1 | 3/2002 | Testroet et al. | |
| 2002/0037119 A1 | 3/2002 | Schleinitz | |
| 2002/0126922 A1 | 9/2002 | Cheng et al. | |
| 2003/0063824 A1 | 4/2003 | Aldridge | |
| 2003/0063826 A1 | 4/2003 | Cevasco et al. | |
| 2003/0147573 A1 | 8/2003 | Bokel et al. | |
| 2003/0179966 A1 | 9/2003 | Hojo et al. | |
| 2005/0129341 A1 | 6/2005 | Hoppe | |
| 2006/0210209 A1 | 9/2006 | Fisk | |
| 2007/0204466 A1 | 9/2007 | Fisk | |
| 2007/0223849 A1 | 9/2007 | Tschopp et al. | |
| 2007/0292062 A1 | 12/2007 | Arnold et al. | |
| 2008/0025656 A1 | 1/2008 | Schutt et al. | |
| 2008/0095481 A1 | 4/2008 | Kummings | |
| 2008/0240631 A1 | 10/2008 | Keller et al. | |
| 2008/0259424 A1 | 10/2008 | Itami et al. | |
| 2010/0139035 A1 * | 6/2010 | Magennis | F16L 5/027 |
| | | | 16/2.1 |
| 2011/0049834 A1 * | 3/2011 | Natu | F16C 11/04 |
| | | | 280/279 |
| 2011/0135232 A1 | 6/2011 | Hagan | |
| 2011/0176907 A1 | 7/2011 | Groves et al. | |
| 2011/0186005 A1 | 8/2011 | Lemke et al. | |
| 2011/0200281 A1 | 8/2011 | Uehara et al. | |
| 2011/0241327 A1 | 10/2011 | Montboeuf et al. | |
| 2011/0311362 A1 | 12/2011 | Corts | |
| 2012/0128279 A1 | 5/2012 | Baker et al. | |
| 2012/0163746 A1 | 6/2012 | Guthrie | |
| 2012/0213458 A1 | 8/2012 | Zuiko | |
| 2012/0237152 A1 | 9/2012 | Wheals | |
| 2012/0240350 A1 | 9/2012 | Natu et al. | |
| 2013/0092476 A1 | 4/2013 | Martin | |
| 2013/0160604 A1 | 6/2013 | McNeil | |
| 2013/0202232 A1 | 8/2013 | Mueller et al. | |
| 2013/0279838 A1 | 10/2013 | Huesges et al. | |
| 2013/0285518 A1 | 10/2013 | Stelmasik | |
| 2013/0336607 A1 | 12/2013 | Hirose et al. | |
| 2014/0037235 A1 | 2/2014 | Raby et al. | |
| 2014/0086518 A1 | 3/2014 | Wright | |
| 2014/0301692 A1 | 10/2014 | Fisk | |
| 2015/0159526 A1 | 6/2015 | Raby et al. | |
| 2015/0184693 A1 | 7/2015 | Lueddecke | |
| 2015/0292561 A1 | 10/2015 | McNeil et al. | |
| 2016/0290390 A1 * | 10/2016 | Ambroise | F16C 17/10 |

FOREIGN PATENT DOCUMENTS

| | | |
|---|---|---|
| JP | 2013194754 A | 9/2013 |
| WO | 2013039618 A1 | 3/2013 |
| WO | 2018026756 A1 | 2/2018 |

* cited by examiner

BEARING

CROSS-REFERENCE TO RELATED APPLICATION(S)

This application claims priority under 35 U.S.C. § 119(e) to U.S. patent application Ser. No. 62/370,021 entitled "BEARING," by Sven Muehling et al., filed Aug. 2, 2016, which is assigned to the current assignee hereof and incorporated herein by reference in its entirety.

FIELD OF THE DISCLOSURE

The present disclosure relates to bearings.

RELATED ART

Bearings generally provide a low friction slip interface between mated components. At a basic level, a bearing can include a low friction material interfacing between two or more components which are movable with respect to one another. The low friction material can have a relatively low coefficient of friction, thus facilitating easier movement between the two or more movable components. Plain bearings typically include a low friction surface material that does not require rolling elements. In this regard, they are simple and cost effective to produce.

Industries which require the use of bearings continue to demand improved bearings capable of performing in improved ways.

BRIEF DESCRIPTION OF THE DRAWINGS

Embodiments are illustrated by way of example and are not intended to be limited in the accompanying figures.

Figure 1:
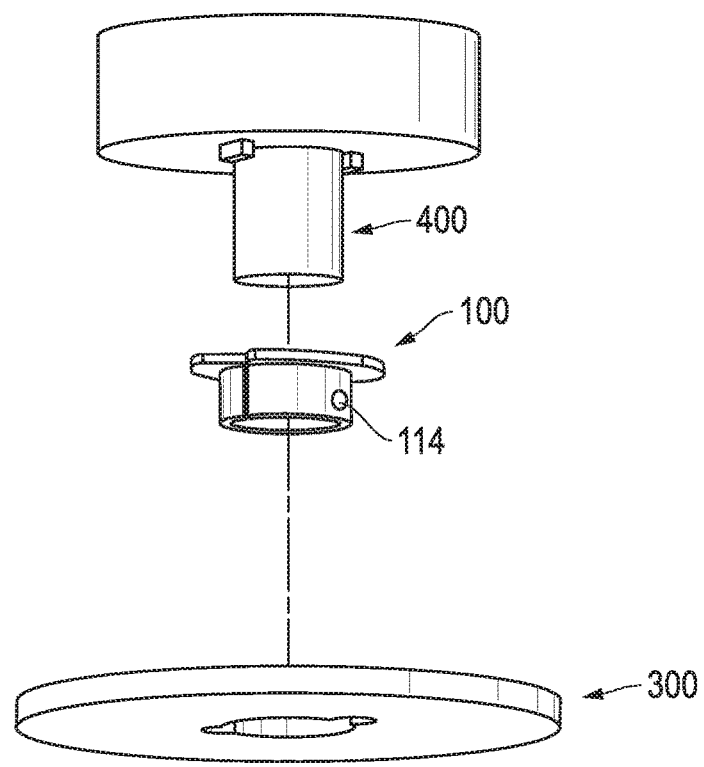
FIG. 1 includes a perspective view of a tool, a bearing, and a structure in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing arts.

In an embodiment, a bearing can include a generally cylindrical sidewall defining first and second axial ends and an aperture extending between the first and second axial ends. A flange can extend radially from the generally cylindrical sidewall at a location proximate to the first axial end. A feature can extend radially from the generally cylindrical sidewall at a location disposed between the flange and the second axial end. The generally cylindrical sidewall can include a low friction material. In a more particular embodiment, the generally cylindrical sidewall can include a substrate coupled to the low friction material.

Figure 2:
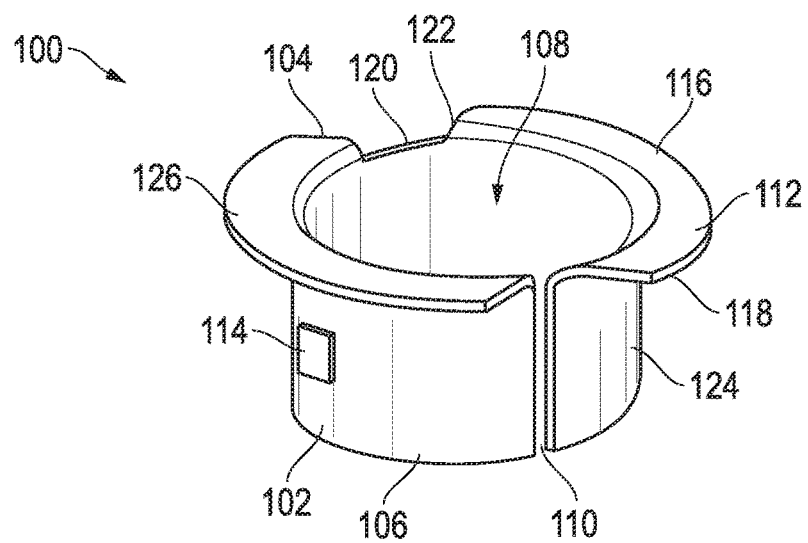
FIG. 2 includes a perspective view of a bearing in accordance with an embodiment.
Figure 3:
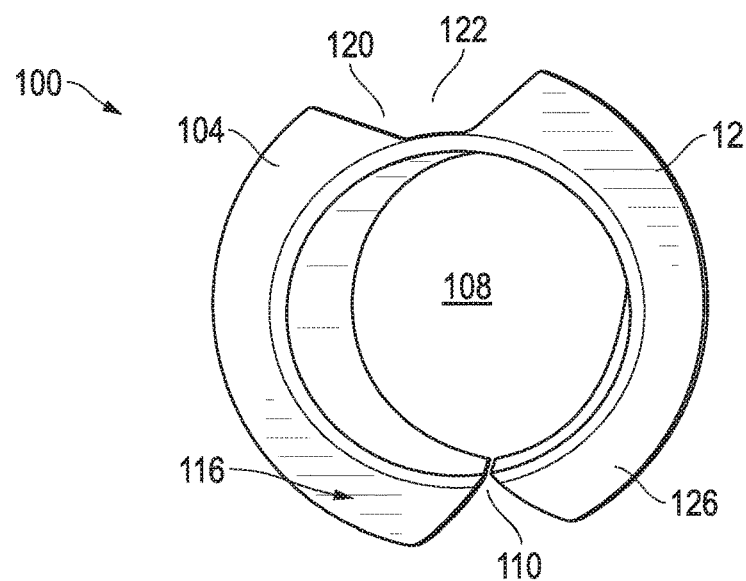
FIG. 3 includes a top view of the bearing in accordance with an embodiment.

Referring initially to FIGS. 1 to 3, a bearing 100 in accordance with one or more of the embodiments described herein can include a generally cylindrical sidewall 102 defining a first axial end 104 and a second axial end 106. An aperture 108 extends at least partially, such as entirely, between the first and second axial ends 104 and 106. The bearing 100 can include a gap 110 extending between the first and second axial ends 104 and 106. In an embodiment, the gap 110 can be open such that circumferential ends of the bearing 100 are spaced apart from one another. In another embodiment, the gap 110 can be closed such as, for example, by an adhesive, a weld, a mechanical fastener or deformation, or any other suitable method recognized by skilled artisans.

A flange 112 can extend radially from the generally cylindrical sidewall 102. In an embodiment, the flange 112 extends radially inward. In another embodiment, the flange 112 extends radially outward. In yet a further embodiment, the flange 112 can extend both radially inward and radially outward. In an embodiment, the flange 112 can be disposed at a location proximate the first axial end 104 of the bearing 100. In a more particular embodiment, the flange 112 is disposed at the first axial end 104 such that no portion of the bearing 100 extends beyond the flange 112. In an embodiment, the flange 112 has a surface 116 and a surface 118 opposite the surface 116. The surface 116 can be disposed closer to the first axial end 104 of the bearing 100 than the surface 118.

A feature 114 can extend radially from the generally cylindrical sidewall 102 at a location between the flange 112 and the second axial end 106 of the bearing 100. The feature 114 can be a projection, a tine, an elongated wave structure, a dimple, a ridge, a corrugation, or another suitable element extending from the generally cylindrical sidewall 102. By way of non-limiting example, the feature 114 can be formed by stamping, pressing, milling, machining, grinding, ablating, deposition, lamination, adhesion, another operating procedure, or any combination thereof. In an embodiment, the feature 114 is unitary with the generally cylindrical sidewall 102. In another embodiment, the feature 114 is not unitary with the generally cylindrical sidewall 102. For example, the feature 114 can be fixedly coupled to the generally cylindrical sidewall 102. In a particular embodiment, an artifact (not illustrated) can occur where the feature 114 is located along the generally cylindrical sidewall 102. For example, features 114 that are pressed radially outward into the generally cylindrical sidewall 102 may form a corresponding recess along the radially inner side of the generally cylindrical sidewall 102. In an embodiment, as illustrated in FIG. 1, the feature 114 can have an arcuate profile, as viewed in cross section. In another embodiment, as illustrated in FIG. 2, the feature 114 can have a polygonal profile, as viewed in cross section. In a particular embodiment, the feature 114 can have a square profile, as viewed in cross section. In yet a further embodiment, the feature 114 can include arcuate segments and polygonal segments, as viewed in cross section.

In an embodiment, the feature 114 can extend from the generally cylindrical sidewall 102 in a direction generally perpendicular thereto. For example, the feature 114 can have a side surface which is perpendicular, or generally perpendicular, to the generally cylindrical sidewall 102 at the location from which the feature 114 extends from. In another embodiment, the feature 114 can have a side surface canted relative to the generally cylindrical sidewall 102. For example, the feature sidewall can be disposed at an angle, as measured with respect to the generally cylindrical sidewall 102, greater than 90°, greater than 100°, greater than 110°, greater than 120°, greater than 130°, greater than 140°, or greater than 150°.

In an embodiment, the feature 114 includes a plurality of features. For example, the plurality of features 114 can include at least 2 features 114, at least 5 features 114, at least 10 features 114, at least 25 features 114, or at least 50 features 114. In another embodiment the plurality of features 114 includes no greater than 100 features. The plurality of features 114 can be spaced apart from one another. In an embodiment, the plurality of features 114 are equally spaced apart from one another as measured around a circumference of the generally cylindrical sidewall 102.

In an embodiment, the feature or features 114 extends in a same radial direction as the flange 112. For example, the flange 112 and feature 114 can both extend radially inward or can both extend radially outward. In another embodiment, the feature 114 extends in a different radial direction as compared to the flange 112. For example, the flange 112 can extend radially inward and the feature can extend radially outward. As illustrated in FIG. 1, the flange 112 and feature 114 both extend radially outward. As described in greater detail below, the feature 114 may be particularly suitable for securing the bearing 100 to a structure.

In a particular instance, the flange 112 is spaced apart from the feature 114 by a distance, D, less than an axial height, $H_B$, of the generally cylindrical sidewall 102. The distance, D, is measured from the surface 118 of the flange 112 to a nearest point of the feature 114. In an embodiment, D is less than $H_B$, such as no greater than 0.99 $H_B$, no greater than 0.95 $H_B$, no greater than 0.9 $H_B$, no greater than 0.85 $H_B$, no greater than 0.8 $H_B$, no greater than 0.75 $H_B$, or no greater than 0.5 $H_B$. In another embodiment, D is no less than 0.01 $H_B$, no less than 0.05 $H_B$, or no less than 0.1 $H_B$.

The flange 112 can extend a maximum radial dimension, $R_F$, as measured from an outermost surface of the generally cylindrical sidewall 102 to an outermost location of the flange 112. The feature 114 can extend a distance, $D_F$, as measured from an outermost surface of the generally cylindrical sidewall 102. In an embodiment, $R_F$ is different than $D_F$. For example, in an embodiment, $R_F$ is greater than $D_F$, such as wherein $R_F$ is at least 1.01 $D_F$, at least 1.05 $D_F$, at least 1.1 $D_F$, at least 1.2 $D_F$, at least 1.3 $D_F$, at least 1.4 $D_F$, at least 1.5 $D_F$, or at least 1.75 $D_F$. In another embodiment, $R_F$ is less than $D_F$, such as wherein $R_F$ is no greater than 0.99 $D_F$, no greater than 0.95 $D_F$, no greater than 0.9 $D_F$, no greater than 0.75 $D_F$, no greater than 0.5 $D_F$, or no greater than 0.25 $D_F$. In a particular embodiment, $R_F$ is uniform as measured around the circumference of the flange 112. In another embodiment, the flange 112 can have a non uniform radial dimension.

An engagement feature 120 can be formed in the flange 112. In an embodiment, the engagement feature 120 can include a cutout 122 extending from the outermost surface of the flange 112 toward a central axis of the generally cylindrical sidewall 102. In a more particular embodiment, cutout 122 can extend at least 0.01 $R_F$, at least 0.1 $R_F$, at least 0.5 $R_F$, or at least 0.9 $R_F$ as measured in a direction parallel with RF.

In an embodiment, the cutout 122 has a polygonal shape, when viewed parallel with the central axis of the generally cylindrical sidewall 102. In another embodiment, the cutout 122 has an arcuate shape when viewed parallel with the central axis of the generally cylindrical sidewall 102. In yet a further embodiment, the cutout 122 has a combination of polygonal portions and arcuate portions.

In an embodiment, the flange 112 has a thickness, $T_F$, or average thickness in the case of a flange with varying thickness, which is no greater than the thickness of the cutout 122. In another embodiment, the cutout extends at least 0.01 $T_F$, at least 0.1 $T_F$, at least 0.25 $T_F$, at least 0.5 $T_F$, at least 0.75 $T_F$, or at least 0.9 $T_F$. In a further embodiment, the cutout 122 extends through the entire thickness, $T_F$, of the flange 112.

The cutout 122 can have a first circumferential dimension, as measured from a top view at a radially innermost portion of the cutout 122, and a second circumferential dimension, as measured from a top view at a radially outermost portion of the cutout 122. In an embodiment, the first circumferential dimension is different than the second circumferential dimension. In a more particularly embodiment, the second circumferential dimension is greater than the first circumferential dimension. For example, the second circumferential dimension can be at least 1.01 times greater than the first circumferential dimension, at least 1.1 times greater than the first circumferential dimension, at least 1.2 times greater than the first circumferential dimension, at least 1.3 times greater than the first circumferential direction, at least 1.4 times greater than the first circumferential dimension, at least 1.5 times greater than the first circumferential direction, or at least 2 times greater than the first circumferential dimension. In an embodiment, the second circumferential dimension is no greater than 1000 times greater than the first circumferential dimension, no greater than 100 times greater than the first circumferential dimension, or no greater than 10 times greater than the first circumferential dimension.

In another embodiment, the engagement feature 120 can be a projecting element, a corrugation, a ridge, a dimple, a tine, another element projecting from the flange 112, or any combination thereof.

In a particular embodiment, the engagement feature 120 includes a plurality of features, such as at least two engagement features, at least three engagement features, at least four engagement features, at least five engagement features, at least ten engagement features, or at least fifty engagement features. In another embodiment, the plurality of engagement features 120 includes no greater than 1000 engagement features, no greater than 500 engagement features, or no greater than 100 engagement features. In a particular embodiment, at least two of the plurality of engagement features 120 have a generally same size, a generally same shape, or a generally same size and a generally same shape, as compared to one another. The plurality of engagement features can be spaced apart around the circumference of the flange 112. In an embodiment, the engagement features 120 are equally spaced apart from one another around a circumference of the flange 120. In a particular embodiment, at least one of the engagement features 120 can be circumferentially aligned with the gap 110.

In an embodiment, the generally cylindrical sidewall 102 can include a substrate 124 and a low friction material 126 coupled to the substrate 124. The substrate 124 can be coupled to the low friction material 126 by an adhesive, a primer layer, mechanical deformation, lamination, or any other suitable method. In an embodiment, the substrate 124 can include a resilient material. In a particular embodiment, the low friction material 126 is disposed along an inner surface of the generally cylindrical sidewall 102. The low friction material 126 can extend onto at least a portion, such as all, of the surface 116 of the flange 112. In another particular embodiment, the low friction material 126 can be disposed along an outer surface of the generally cylindrical sidewall 102. The low friction material 126 can extend onto at least a portion, such as all, of the surface 118 of the flange 118.

By way of a non-limiting example, the substrate 124 can include a metal or an alloy such as steel.

The low friction material 126 can include a material having a relatively low coefficient of friction. Exemplary materials include polymers, such as for example, a polyketone, a polyaramid, a polyimide, a polyetherimide, a polyamideimide, a polyphenylene sulfide, a polyphenylene sulfone, a fluoropolymer, a polybenzimidazole, a derivation thereof, or even a combination thereof. In a particular embodiment, the low friction material 126 can at least partially include, or consist essentially of a polymer, such as a polyketone, a thermoplastic polyimide, a polyetherimide, a polyphenylene sulfide, a polyether sulfone, a polysulfone, a polyamideimide, a derivative thereof, or even a combination thereof. In a further embodiment, the low friction material 126 can include a polyketone, such as polyether ether ketone (PEEK), polyether ketone, polyether ketone ketone, polyether ketone ether ketone, a derivative thereof, or even a combination thereof.

Fluoropolymers are used according to a particular embodiment. Exemplary fluoropolymers include fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof.

In certain embodiments, the low friction material 126 can include one or more filler materials. Exemplary filler materials include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler material can include alumina, silica, titanium dioxide, calcium fluoride, boron nitride, mica, Wollastonite, silicon carbide, silicon nitride, zirconia, carbon black, pigments, or any combination thereof.

Figure 4:
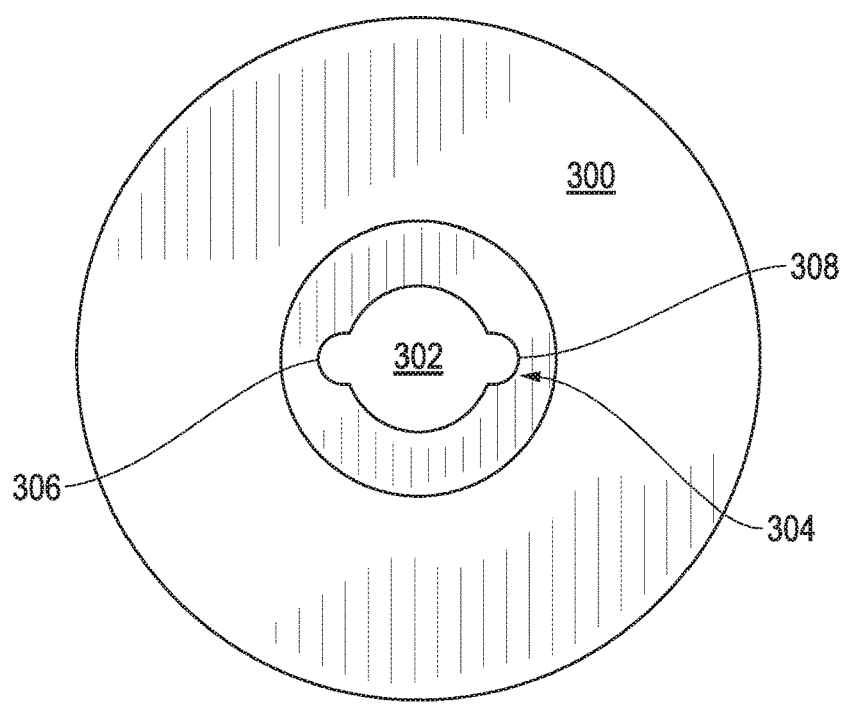
FIG. 4 includes a plan view of a structure having an opening including arcuate relief portions adapted to receive the bearing in accordance with an embodiment.
Figure 5:
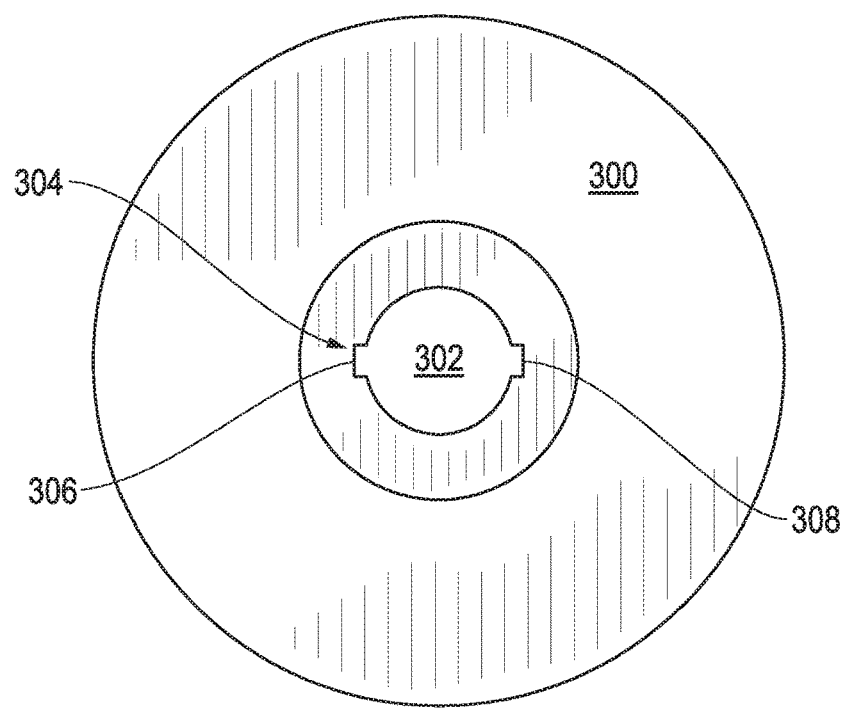
FIG. 5 includes a plan view of a structure having an opening including polygonal relief portions adapted to receive the bearing in accordance with an embodiment.

FIGS. 4 and 5 illustrate a structure 300 including an opening 302 defining a relief portion 304. By way of non-limiting example, the structure 300 can include a substrate, a tubular, a wall, or a sheet. The structure 300 can have a thickness, TS that is slightly less than the distance, D, between the feature 114 and the flange 112. In an embodiment, TS is no less than 0.85 D, no less than 0.9 D, no less than 0.95 D, no less than 0.96 D, no less than 0.97 D, no less than 0.98 D, or no less than 0.99 D. In another embodiment, TS is no greater than 1.5 D, no greater than 1.3 D, no greater than 1.1 D, no greater than 1.05 D, or no greater than 1.01 D.

In an embodiment, the structure 300 can have varying thickness. For example, a thickness at first location along the circumference of the opening 302 can be greater than a thickness at a second location along the circumference of the opening 302. To compensate for variable thickness, the bearing 100 can have multiple features 114 each having a different spatial arrangement with respect to the flange 112.

Figure 7A:
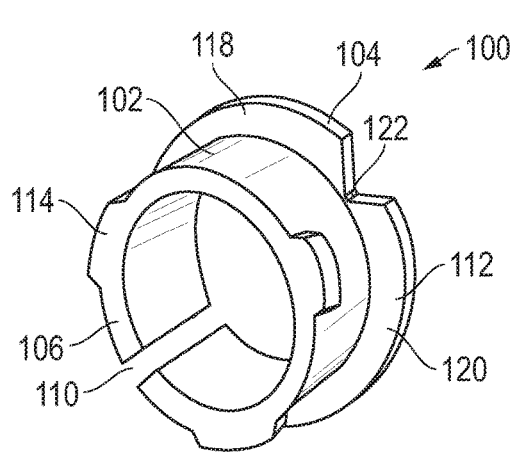
FIG. 7A includes a perspective view of a bearing in accordance with an embodiment.
Figure 7B:
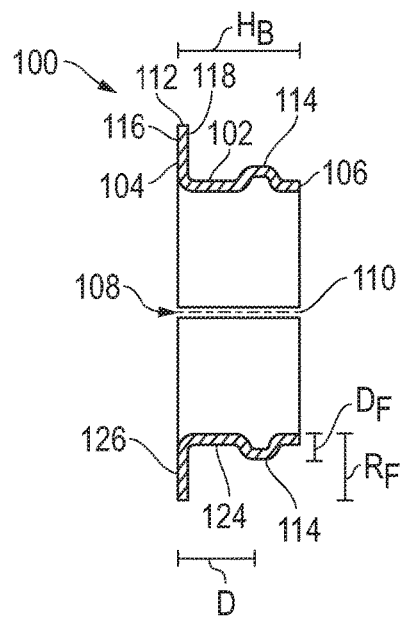
FIG. 7B includes a side cross-sectional view of a bearing in accordance with an embodiment.
Figure 7C:
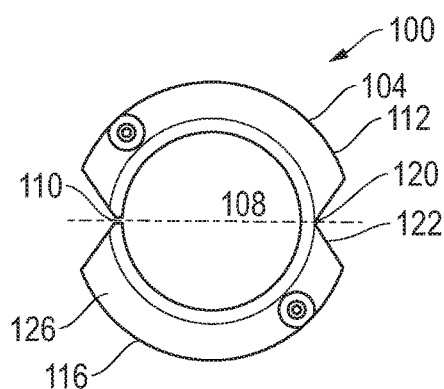
FIG. 7C includes a top view of a bearing in accordance with an embodiment.
Figure 7D:
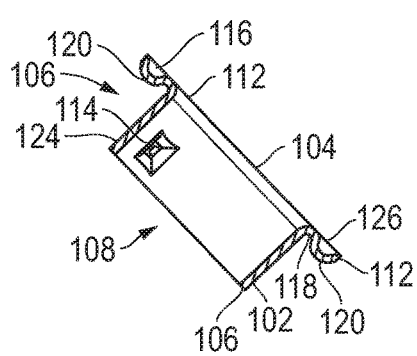
FIG. 7D includes a side cross-sectional view of a bearing in accordance with an embodiment.
Figure 8:
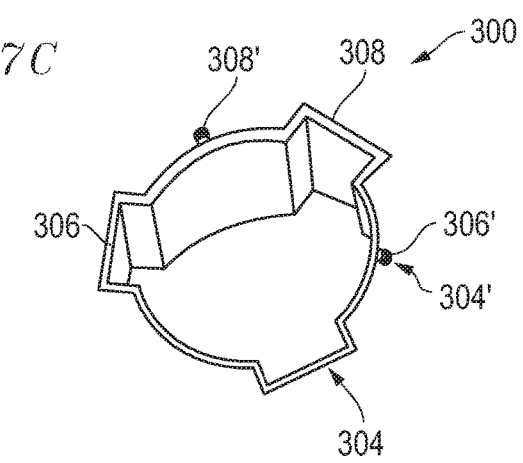
FIG. 8 includes a perspective view of a structure having an opening including arcuate relief portions adapted to receive the bearing in accordance with an embodiment.

In another embodiment, the bearing 100 can include a plurality of features 114 at different distances, D, from the flange to permit engagement of the bearing 100 with structures of different thicknesses. For example, the bearing 100 can include a first feature 114 spaced apart from the flange by a first distance and a second feature 114 spaced apart from the flange by a second distance. The first feature 114 can secure the bearing 100 to a structure 300 with a first thickness and the second feature 114 can secure the bearing 100 to a structure 300 with a second thickness. In such a manner, one sized bearing 100 can be used in a range of applications having different dimensional requirements. In a number of embodiments, as shown in FIGS. 7A-8, at least one feature 114 may secure the bearing 100 to the structure 300 by providing a matching interface with a relief portion 304 of the structure 300. In a number of embodiments, the at least one feature 114 may be a square notch that matches a relief portion 304 in the form of a cylindrical projection or opening. In a number of embodiments, at least one engagement feature 120 may secure the bearing 100 to the structure 300 by providing a matching interface with a relief portion 304 of the structure 300. In a number of embodiments, the at least one engagement feature 120 may be a dimple located on a surface 116, 118 of the flange 112 that matches a relief portion 304 in the form of a cylindrical projection or opening. In a number of embodiments, turning the bearing 100 while sitting in a relief portion 304 may create axial pressure between the engagement feature 120 and the feature 114 such that the bearing 100 may be locked without a second flange 112 on the bearing 100 required.

The relief portion 304 can be in open communication with the opening 302 and extend radially outward therefrom. The relief portion 304 can be adapted to receive the feature 114. As illustrated in FIG. 4, at least one relief portion 304 can have an arcuate shape, from a plan view. As illustrated in FIG. 5, at least one relief portion 304 can have an polygonal shape, from a plan view. In an embodiment, the relief portion 304 includes a plurality of relief portions spaced apart around a circumference of the opening 302. In an embodiment, the relief portions 304 can be spaced apart equally around the circumference of the flange 112. In a particular embodiment, the plurality of relief portions 304 can include at least 2 relief portions, at least 3 relief portions, at least 4 relief portions, at least 5 relief portions, or at least 10 relief portions. In another embodiment, the plurality of relief portions 304 includes no greater than 100 relief portions, no greater than 50 relief portions, or no greater than 25 relief portions.

As illustrated in FIGS. 4 and 5, the relief portion 304 can include a first relief portion 306 and a second relief portion 308. The first and second relief portions 306 and 308 are diametrically opposite one another. The opening 302 has a first diameter, D1, as measured between opposite ends of the opening 302 and a second diameter, D2 measured by a distance between two radially outermost surfaces of the first and second relief portions 306 and 308. In an embodiment, $D_2$ is greater than D1. For example, in an embodiment, $D_2$ is at least 1.01 $D_1$, at least 1.05 $D_1$, at least 1.1 $D_1$, or at least 1.2 $D_1$. In another embodiment, D2 is no greater than 3.0 D1, no greater than 2.5 D1, no greater than 2.0 D1, or no greater than 1.5 D1.

The opening 302 can define a circumference, $C_O$, and the relief portion can define a circumferential width, $C_{RP}$, as measured along the circumference of the opening, that is less than $C_O$. In an embodiment, $C_{RP}$ is in a range of 0.1 $C_O$ to 0.99 $C_O$, in a range of 0.2 $C_O$ to 0.9 $C_O$, or in a range of 0.3 $C_O$ to 0.8 $C_O$.

Figure 6:
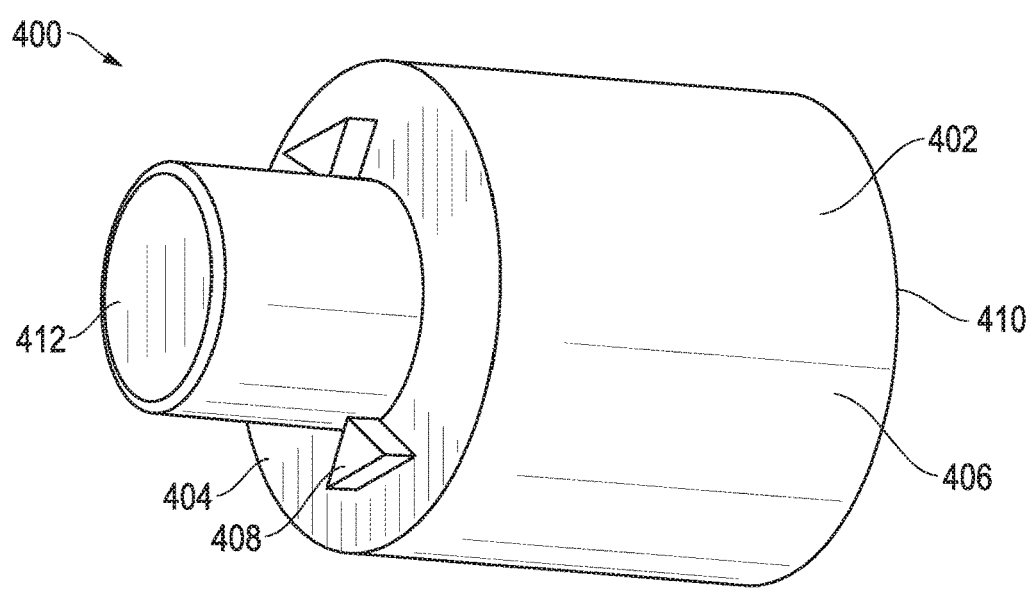
FIG. 6 includes a perspective view of an alignment tool adapted to rotate the bearing in accordance with an embodiment.

FIG. 6 illustrates an alignment tool 400 including a body 402 and a complementary engagement feature 404 disposed on the body 402. The alignment tool 400 can engage with the engagement features 120 on the bearing 100 such that a user can rotate the bearing 100 through the alignment tool 400. In an embodiment, the complementary engagement feature 404 has a shape similar to the engagement feature 120. For example, as illustrated, the complementary engagement feature 404 can include a generally triangular projection adapted to be received in the triangular cutouts of the bearing 100. The body 402 can extend away from the complementary engagement feature 404, permitting a user to grasp the alignment tool 400 to rotate the bearing 100.

In an embodiment, the body 402 has a generally cylindrical sidewall 406 and opposite axial ends 408 and 410. The complementary engagement feature 404 can be disposed proximate to one of the opposite axial ends 408 or 410. A projection 412 can extend from the body 402 and fit within the aperture 108 of the bearing 100. In an embodiment, the projection 412 is disposed between the complementary engagement features 404. The projection 412 can have a diameter less than or generally equal to the diameter of the aperture 108. The projection 412 permits smoother engagement between the alignment tool 400 and the bearing 100 by allowing a user to more easily position and align the alignment tool 400 relative to the aperture 108 and engagement features 120.

In an embodiment, the alignment tool 400 can be powered. That is, the alignment tool 400 can include an urging element adapted to rotate the complementary engagement feature 404. In another embodiment, the alignment tool 400 can be adapted to be connected to a power tool. In a further embodiment, the alignment tool 400 is adapted to be manually operated.

In certain embodiments, the alignment tool 400 can include an encoding element (not illustrated) adapted to determine the relative rotational position of the alignment tool 400 (e.g., the complementary engagement features 404). In a particular embodiment, the encoding element or another sensor can sense a rotational position of the alignment tool before application of torque on the bearing 100 and after application of torque on the bearing 100.

Referring again to FIG. 1, the bearing 100 can be positioned on the structure 300 at a location adjacent to the opening 302. The bearing 100 can then be at least partially inserted into the opening 302 such that the second axial end 106 extends at least partially into the opening 302. After aligning the feature 114 with the relief portion 304, the bearing 100 can be inserted into the opening 302 until the surface 118 of the bearing 100 contacts a surface of the structure 300. The alignment tool 400 can then be aligned with the bearing 100 such that the complementary engagement feature 404 of the alignment tool 400 is aligned with the engagement feature 120 of the bearing. The alignment tool 400 can then be used to rotate the bearing 100 within the opening 302 until the feature 114 is not disposed in axial alignment with the relief portion 304.

In an embodiment, the bearing 100 is adapted to be installed in the opening 302 in a first rotational orientation. In the first rotational orientation the feature 114 of the bearing 100 is aligned with the relief portion 304. After initial installation within the opening 302, the bearing can be rotated to a second rotational orientation different from the first rotational orientation. The second rotational orientation of the bearing 100 puts the feature 114 at a location spaced apart from the relief portion 304 such that the bearing 100 cannot be pulled axially from the opening 302 without at least partially rotating the bearing 100. In an embodiment, the first rotational orientation is different from the second rotational orientation by at least 1°, at least 5°, at least 10°, at least 20°, at least 30°, at least 40°, at least 50°, at least 60°, at least 70°, at least 80°, or at least 90°. In another embodiment, the first rotational orientation is different from the second rotational orientation by less than 360°, less than 270°, less than 180°, or less than 91°. The rotational difference between the first rotational orientation and second rotational orientation is largely determined by the arrangement of relief portions 304. A greater number of relief portions 304 may result in a lesser difference in rotational orientation between the first and second rotational orientations.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1 A bearing comprising:
a generally cylindrical sidewall defining first and second axial ends and an aperture extending between the first and second axial ends;
a flange extending radially from the generally cylindrical sidewall at a location proximate the first axial end; and
a feature extending radially from the generally cylindrical sidewall at a location disposed between the flange and the second axial end,
wherein the generally cylindrical sidewall comprises a low friction material.

Embodiment 2 An assembly comprising:
a structure having an opening with a relief portion;
a bearing disposed within the opening, wherein the bearing comprises:
a generally cylindrical sidewall defining first and second axial ends and an aperture extending between the first and second axial ends;
a flange extending from the generally cylindrical sidewall; and
a feature extending radially from the generally cylindrical sidewall,
wherein the flange is disposed on a first side of the structure, wherein the feature is disposed on a second side of the structure, the second side being opposite the first side, and wherein the relief portion of the opening is adapted to receive the feature.

Embodiment 3 A method of installing a bearing comprising:
providing a bearing having a generally cylindrical sidewall defining first and second axial ends and an aperture extending between the first and second axial ends, a flange disposed at a location proximate the first axial end, and a feature projecting radially from the generally cylindrical sidewall at a location between the flange and the second axial end;
aligning the bearing with a surface having an opening with a relief portion at a circumferential location corresponding to the feature;
inserting the bearing into the opening such that the feature passes through the relief portion;
urging the bearing into the opening until the flange contacts the surface; and
rotating the bearing until the feature is angularly offset from the relief portion.

Embodiment 4 The bearing, assembly, or method of any one of the preceding embodiments, wherein the generally cylindrical sidewall comprises a substrate and a low friction material, and wherein the low friction material is coupled to the substrate.

Embodiment 5 The bearing, assembly, or method of embodiment 4, wherein the feature extends radially outward from the generally cylindrical sidewall, and wherein the low friction material is disposed along an inner surface of the generally cylindrical sidewall.

Embodiment 6 The bearing, assembly, or method of any one of the preceding embodiments, wherein the flange is disposed at the first axial end of the bearing.

Embodiment 7 The bearing, assembly, or method of any one of the preceding embodiments, wherein the flange is spaced apart from the feature by a distance, D, wherein the generally cylindrical sidewall has an axial height, HB, and wherein D is less than HB, such as wherein D is no greater than 0.99 HB, no greater than 0.95 HB, no greater than 0.9 HB, no greater than 0.85 HB, no greater than 0.8 HB, no greater than 0.75 HB, or no greater than 0.5 HB.

Embodiment 8 The bearing, assembly, or method of embodiment 7, wherein D is no less than 0.01 HB, no less than 0.05 HB, or no less than 0.1 HB.

Embodiment 9 The bearing, assembly, or method of any one of the preceding embodiments, wherein the flange and feature extend in a same radial direction as one another, such as wherein the flange and feature both extend radially outward from the generally cylindrical sidewall.

Embodiment 10 The bearing, assembly, or method of any one of the preceding embodiments, wherein the flange has a first surface and a second surface opposite the first surface, wherein the first surface is closer to the first axial end than the second surface, and wherein the first surface comprises a low friction material.

Embodiment 11 The bearing, assembly, or method of any one of the preceding embodiments, wherein the flange extends a maximum radial dimension, RF, as measured from an outermost surface of the generally cylindrical sidewall, wherein the feature extends a distance, DF, as measured from an outermost surface of the generally cylindrical sidewall, and wherein RF and DF are different from one another.

Embodiment 12 The bearing, assembly, or method of embodiment 11, wherein RF is greater than DF, such as wherein RF is at least 1.01 DF, at least 1.05 DF, at least 1.1 DF, at least 1.2 DF, at least 1.3 DF, at least 1.4 DF, at least 1.5 DF, or at least 1.75 DF.

Embodiment 13 The bearing, assembly, or method of embodiment 11, wherein RF is less than DF, such as wherein RF is no greater than 0.99 DF, no greater than 0.95 DF, no greater than 0.9 DF, no greater than 0.75 DF, no greater than 0.5 DF, or no greater than 0.25 DF.

Embodiment 14 The bearing, assembly, or method of any one of embodiments 11-13, wherein RF is uniform around the circumference of the flange.

Embodiment 15 The bearing, assembly, or method of any one of the preceding embodiments, wherein the flange comprises an engagement feature.

Embodiment 16 The bearing, assembly, or method of embodiment 15, wherein the engagement feature comprises a cutout extending from an outermost surface of the flange toward a central axis of the generally cylindrical sidewall.

Embodiment 17 The bearing, assembly, or method of embodiment 16, wherein the flange has a maximum radial dimension, RF, as measured from an outermost surface of the generally cylindrical sidewall, and wherein the cutout extends at least 0.01 RF, at least 0.1 RF, at least 0.5 RF, or at least 0.9 RF.

Embodiment 18 The bearing, assembly, or method of any one of embodiments 16 and 17, wherein the cutout comprises a shape, when viewed parallel with a central axis of the generally cylindrical sidewall, and wherein the shape is polygonal, arcuate, or includes a combination of polygonal and arcuate portions.

Embodiment 19 The bearing, assembly, or method of any one of embodiments 16-18, wherein the flange has a thickness, TF, as measured between a first surface of the flange and a second surface of the flange opposite the first surface, and wherein the cutout extends at least 0.01 TF, at least 0.1 TF, at least 0.25 TF, at least 0.5 TF, at least 0.75 TF, or at least 0.9 TF.

Embodiment 20 The bearing, assembly, or method of embodiment 19, wherein the cutout extends through the entire thickness of the flange.

Embodiment 21 The bearing, assembly, or method of any one of embodiments 16-20, wherein the cutout has a first circumferential dimension, as measured at a radially innermost portion of the cutout, and a second circumferential dimension, as measured at a radially outermost portion of the cutout, and wherein the first circumferential dimension is different than the second circumferential dimension, such as wherein the second circumferential dimension is greater than the first circumferential dimension.

Embodiment 22 The bearing, assembly, or method of any one of embodiments 15-21, wherein the engagement feature comprises a projecting element, a cutout, a corrugation, a ridge, or any combination thereof.

Embodiment 23 The bearing, assembly, or method of any one of embodiments 15-22, wherein the engagement feature comprises a plurality of features such as at least two features, at least three features, at least four features, or at least five features.

Embodiment 24 The bearing, assembly, or method of embodiment 23, wherein the engagement features of the plurality of engagement features are equally spaced apart from one another around a circumference of the flange.

Embodiment 25 The bearing, assembly, or method of any one of embodiments 23 and 24, wherein at least two of the plurality of engagement features have a generally same size, a generally same shape, or a combination thereof.

Embodiment 26 The bearing, assembly, or method of any one of embodiments 15-25, wherein the engagement feature is adapted to receive a complementary engagement feature of an alignment tool.

Embodiment 27 The bearing, assembly, or method of embodiment 26, wherein the bearing is adapted to be rotated when the complementary engagement feature of the alignment tool is rotated.

Embodiment 28 The bearing, assembly, or method of any one of embodiments 15-27, wherein the generally cylindrical sidewall comprises a gap extending between the first and second axial ends, and wherein at least a portion of the engagement feature is disposed at a same circumferential position as the gap.

Embodiment 29 The bearing, assembly, or method of any one of embodiment 1-27, wherein the generally cylindrical sidewall further comprises a gap extending between the first and second axial ends.

Embodiment 30 The bearing, assembly, or method of any one of embodiments 28 and 29, wherein the gap extends along an entire axial length of the bearing.

Embodiment 31 The bearing, assembly, or method of any one of embodiments 28-30, wherein the gap is closed such that circumferential ends of the body defining the gap are secured together, for example, by welding, adhesive, mechanical deformation, another suitable method, or any combination thereof.

Embodiment 32 The bearing, assembly, or method of any one of the preceding embodiments, wherein the feature comprises a projection extending from the generally cylindrical sidewall.

Embodiment 33 The bearing, assembly, or method of any one of the preceding embodiments, wherein the feature is formed by stamping, pressing, milling, or otherwise operating on the generally cylindrical sidewall.

Embodiment 34 The bearing, assembly, or method of any one of the preceding embodiments, wherein the feature comprises a dimple, a tine, an elongated wave structure, a component coupled to the generally cylindrical sidewall, or a combination thereof.

Embodiment 35 The bearing, assembly, or method of any one of the preceding embodiments, wherein the feature comprises a plurality of features, and wherein the plurality of features are equally spaced apart from one another circumferentially around the generally cylindrical sidewall.

Embodiment 36 The bearing, assembly, or method of any one of the preceding embodiments, wherein the feature is unitary with the generally cylindrical sidewall.

Embodiment 37 The bearing, assembly, or method of any one of the preceding embodiments, wherein the feature is fixedly coupled to the generally cylindrical sidewall.

Embodiment 38 The bearing, assembly, or method of any one of the preceding embodiments, wherein the feature comprises a first feature and a second feature extending from the generally cylindrical sidewall, wherein the first and second features are axially aligned and spaced apart from one another, wherein the first feature is adapted to secure the bearing to a first structure having a first thickness, and wherein the second feature is adapted to secure the bearing to a second structure having a second thickness different from the first thickness.

Embodiment 39 The bearing, assembly, or method of any one of the preceding embodiments, wherein the feature comprises an arcuate profile, a polygonal profile, or a combination of arcuate and polygonal segments, as viewed in cross section.

Embodiment 40 The bearing, assembly, or method of any one of the preceding embodiments, wherein the feature has a side surface extending perpendicular to the generally cylindrical sidewall at an area from which the feature extends.

Embodiment 41 The bearing, assembly, or method of any one of embodiments 1-39, wherein the feature has a side surface canted relative to the generally cylindrical sidewall at an area from which the feature extends.

Embodiment 42 The bearing, assembly, or method of any one of embodiments 2-41, wherein the relief portion is in open communication with and extends radially outward from the opening.

Embodiment 43 The bearing, assembly, or method of any one of embodiments 2-42, wherein the relief portion comprises a plurality of relief portions, and wherein the plurality of relief portions are equally spaced apart in a circumferential direction.

Embodiment 44 The bearing, assembly, or method of any one of embodiments 2-3, wherein the relief portion comprises a first relief portion and a second relief portion diametrically opposite the first relief portion, wherein the opening has a first diameter, $D_1$, as measured between opposite ends of the opening, and a second diameter, $D_2$, as measured by a distance between two radially outermost surfaces of the first and second relief portions, and wherein $D_2$ is greater than $D_1$.

Embodiment 45 The bearing, assembly, or method of embodiment 44, wherein $D_2$ is at least 1.01 $D_1$, at least 1.05 $D_1$, at least 1.1 $D_1$, or at least 1.2 $D_1$.

Embodiment 46 The bearing, assembly, or method of any one of the preceding embodiments, wherein the opening has a circumference, CO, wherein the relief portion has a circumferential width, CRP, as measured along the circumference of the opening, and wherein CRP is in a range of 0.1 CO to 0.99 CO, in a range of 0.2 CO to 0.9 CO, or in a range of 0.3 CO to 0.8 CO.

Embodiment 47 The bearing, assembly, or method of any one of the preceding embodiments, wherein the bearing is adapted to be installed in an opening, wherein the bearing is inserted into the opening at a first rotational orientation, and wherein the bearing is secured within the opening at a second rotational orientation, the first rotational orientation being different than the second rotational orientation.

Embodiment 48 The bearing, assembly, or method of embodiment 47, wherein the first rotational orientation is different from the second rotational orientation by at least 1°, at least 5°, at least 10°, at least 20°, at least 30°, at least 40°, at least 50°, at least 60°, at least 70°, at least 80°, or at least 90°.

Embodiment 49 The bearing, assembly, or method of any one of embodiments 47 and 48, wherein the first rotational orientation is different from the second rotational orientation by less than 360°, less than 270°, less than 180°, or less than 91°.

Embodiment 50 An alignment tool adapted to orient a bearing within an opening, the alignment tool comprising:
a body;
a complementary engagement feature extending from the body, wherein the complementary engagement feature is adapted to engage with engagement features on the bearing, and wherein the alignment tool is adapted to rotate the bearing within the opening to secure the bearing therein.

Embodiment 51 The alignment tool of embodiment 50, wherein the complementary engagement features have a shape similar to the engagement features on the bearing.

Embodiment 52 The alignment tool of any one of embodiments 50 and 51, wherein the body comprises a generally cylindrical sidewall and opposite axial ends, and wherein the complementary engagement feature is disposed proximate one of the opposite axial ends.

Embodiment 53 The alignment tool of any one of embodiments 50-52, wherein the alignment tool is powered, manually operated, or a combination thereof.

Embodiment 54 The alignment tool of any one of embodiments 50-53, wherein the alignment tool further comprises an encoding element adapted to determine the relative rotational position of the alignment tool.

Note that not all of the activities described above in the general description or in the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the embodiments.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A bearing comprising:
a generally cylindrical sidewall defining first and second axial ends and an aperture extending between the first and the second axial ends, and a gap extending between the first and the second axial ends;
a flange extending radially from the generally cylindrical sidewall at a location proximate the first axial end; and
a feature extending radially from the generally cylindrical sidewall at a location disposed between the flange and the second axial end,
wherein the generally cylindrical sidewall comprises a low friction material, wherein the flange comprises an engagement feature circumferentially offset from the gap.

2. The bearing of claim 1, wherein the generally cylindrical sidewall comprises a substrate and a low friction material, and wherein the low friction material is coupled to the substrate.

3. The bearing of claim 1, wherein the feature extends radially outward from the generally cylindrical sidewall, and wherein the low friction material is disposed along an inner surface of the generally cylindrical sidewall.

4. The bearing of claim 1, wherein the flange is disposed at the first axial end of the bearing.

5. The bearing of claim 1, wherein the flange is spaced apart from the feature by a distance, D, wherein the generally cylindrical sidewall has an axial height, $H_B$, and wherein D is less than $H_B$, such as wherein D is no greater than 0.99 $H_B$, and wherein D is no less than 0.01 $H_B$.

6. The bearing of claim 1, wherein the flange and feature extend in a same radial direction as one another, such as wherein the flange and feature both extend radially outward from the generally cylindrical sidewall.

7. The bearing of claim 1, wherein the flange has a first surface and a second surface opposite the first surface, wherein the first surface is closer to the first axial end than the second surface, and wherein the first surface comprises a low friction material.

8. The bearing of claim 1, wherein the flange extends a maximum radial dimension, $R_F$, as measured from an outermost surface of the generally cylindrical sidewall, wherein the feature extends a distance, $D_F$, as measured from an outermost surface of the generally cylindrical sidewall, and wherein $R_F$ and $D_F$ are different from one another.

9. The bearing of claim 8, wherein $R_F$ is greater than $D_F$, such as wherein $R_F$ is at least 1.01 $D_F$.

10. The bearing of claim 8, wherein $R_F$ is uniform around the circumference of the flange.

11. An assembly comprising:
a structure having an opening with a relief portion;
a bearing disposed within the opening, wherein the bearing comprises:
a generally cylindrical sidewall defining first and second axial ends and an aperture extending between the first and the second axial ends, and a gap extending between the first and the second axial ends;
a flange extending from the generally cylindrical sidewall; and
a feature extending radially from the generally cylindrical sidewall,
wherein the flange is disposed on a first side of the structure, wherein the feature is disposed on a second side of the structure, the second side being opposite the first side, and wherein the relief portion of the opening is adapted to receive the feature, wherein the flange comprises an engagement feature circumferentially offset from the gap.

12. The assembly of claim 11, wherein the engagement feature comprises a cutout extending from an outermost surface of the flange toward a central axis of the generally cylindrical sidewall.

13. The assembly of claim 12, wherein the cutout comprises a shape, when viewed parallel with a central axis of the generally cylindrical sidewall, and wherein the shape is polygonal, arcuate, or includes a combination of polygonal and arcuate portions.

14. The assembly of claim 12, wherein the cutout extends through the entire thickness of the flange.

15. The assembly of claim 12, wherein the cutout has a first circumferential dimension, as measured at a radially innermost portion of the cutout, and a second circumferential dimension, as measured at a radially outermost portion of the cutout, and wherein the first circumferential dimension is different than the second circumferential dimension, such as wherein the second circumferential dimension is greater than the first circumferential dimension.

16. The assembly of claim 11, wherein the engagement feature comprises a projecting element, a cutout, a corrugation, a ridge, or any combination thereof.

17. The assembly of claim 11, wherein the engagement features of the plurality of engagement features are equally spaced apart from one another around a circumference of the flange.

18. The assembly of claim 11, wherein the engagement feature is adapted to receive a complementary engagement feature of an alignment tool.

19. A method of installing a bearing comprising:
providing the bearing having a generally cylindrical sidewall defining a first axial end and a second axial end and an aperture extending between the first axial end and the second axial end, a flange disposed at a location proximate the first axial end, and a feature projecting radially from the generally cylindrical sidewall at a location between the flange and the second axial end;
aligning the bearing with a surface having an opening with a relief portion at a circumferential location corresponding to the feature;
inserting the bearing into the opening such that the feature passes through the relief portion;
urging the bearing into the opening until the flange contacts the surface; and rotating the bearing until the feature is angularly offset from the relief portion.

* * * * *